(12) United States Patent
Chang

(10) Patent No.: US 8,812,756 B2
(45) Date of Patent: Aug. 19, 2014

(54) METHOD OF DISPATCHING AND TRANSMITTING DATA STREAMS, MEMORY CONTROLLER AND STORAGE APPARATUS

(75) Inventor: Ching-Wen Chang, Hsinchu (TW)

(73) Assignee: Phison Electronics Corp., Miaoli (TW)

( * ) Notice: Subject to any disclaimer, the term of this patent is extended or adjusted under 35 U.S.C. 154(b) by 162 days.

(21) Appl. No.: 12/895,872

(22) Filed: Oct. 1, 2010

(65) Prior Publication Data
US 2011/0022746 A1    Jan. 27, 2011

Related U.S. Application Data

(63) Continuation-in-part of application No. 12/212,004, filed on Sep. 17, 2008.

(30) Foreign Application Priority Data

Jun. 13, 2008  (TW) ............................... 97122206 A
Aug. 12, 2010  (TW) ............................... 99126950 A

(51) Int. Cl.
| G06F 3/00 | (2006.01) |
| G06F 13/00 | (2006.01) |
| G06F 5/00 | (2006.01) |
| G06F 13/12 | (2006.01) |
| G06F 12/00 | (2006.01) |
| G06F 21/60 | (2013.01) |
| G06F 21/79 | (2013.01) |

(52) U.S. Cl.
CPC .................................. *G06F 21/606* (2013.01); *G06F 21/79* (2013.01)
USPC ........ 710/74; 710/5; 710/15; 710/16; 710/17; 710/19; 710/33; 710/36; 710/54; 711/2; 711/100; 711/103; 711/118; 711/209

(58) Field of Classification Search
USPC ................... 710/10, 36, 74, 301, 305, 310, 5, 710/15–17, 19, 33, 52; 370/463; 711/154, 711/2, 100, 103, 118, 209; 340/7.22
See application file for complete search history.

(56) References Cited

U.S. PATENT DOCUMENTS

| 4,071,706 | A | * | 1/1978 | Warren ......................... 370/463 |
| 5,574,945 | A | * | 11/1996 | Elko et al. ......................... 710/5 |
| 6,021,311 | A | * | 2/2000 | Gibson et al. ................ 340/7.22 |
| 7,730,222 | B2 | * | 6/2010 | Passerini .......................... 710/5 |
| 7,739,921 | B1 | * | 6/2010 | Babcock .................... 73/861.57 |
| 7,954,114 | B2 | * | 5/2011 | Chamberlain et al. ......... 719/320 |
| 7,963,443 | B2 | * | 6/2011 | Patton ........................... 235/451 |

(Continued)

*Primary Examiner* — Farley Abad
*Assistant Examiner* — Henry Yu
(74) *Attorney, Agent, or Firm* — Jianq Chyun IP Office

(57) ABSTRACT

A method of dispatching and transmitting data stream, which is used for a memory storage apparatus having a non-volatile memory module and a smart card chip, is provided. The method includes configuring a plurality of logical block addresses, and a plurality of specific logical block addresses are used for storing a specific file. The method also includes receiving a response data unit from the smart card chip and storing the response data unit in a buffer memory. The method also includes, when a logical block address corresponding to a read command from a host system belongs to one of the specific logical block addresses and the buffer memory stores a response data unit, transmitting the response data unit stored in the buffer memory to the host system. Accordingly, the method can make the host system to correctly receive the response data unit from the smart card chip.

20 Claims, 10 Drawing Sheets

(56) References Cited

U.S. PATENT DOCUMENTS

| | | |
|---|---|---|
| 2004/0054841 A1* | 3/2004 | Callison et al. ............... 710/310 |
| 2004/0093454 A1* | 5/2004 | Teng ............................. 710/310 |
| 2004/0172493 A1* | 9/2004 | Askar ........................... 710/305 |
| 2006/0085583 A1* | 4/2006 | Yu et al. ........................ 710/301 |
| 2006/0174089 A1* | 8/2006 | Altman et al. .................. 712/24 |
| 2007/0233910 A1* | 10/2007 | Paley et al. .................... 710/36 |
| 2008/0183978 A1* | 7/2008 | Sohn ............................. 711/154 |
| 2009/0125643 A1* | 5/2009 | Prevost et al. .................. 710/10 |

* cited by examiner

METHOD OF DISPATCHING AND TRANSMITTING DATA STREAMS, MEMORY CONTROLLER AND STORAGE APPARATUS

CROSS-REFERENCE TO RELATED APPLICATION

This application is a continuation-in-part application of and claims the priority benefit of U.S. application Ser. No. 12/212,004, filed on Sep. 17, 2008, now pending, which claims the priority benefit of Taiwan application serial no. 97122206, filed on Jun. 13, 2008. This application also claims the priority benefits of Taiwan application serial no. 99126950, filed on Aug. 12, 2010. The entirety of each of the above-mentioned patent applications is hereby incorporated by reference herein and made a part of this specification.

BACKGROUND

1. Technology Field

The present invention relates to a method of dispatching and transmitting data streams and particularly to a method of dispatching and transmitting data streams between a host system and a memory storage apparatus having a non-volatile memory and a smart card chip, and a memory controller and a memory storage system using the same.

2. Description of Related Art

The markets of digital cameras, cellular phones, and MP3 players have expanded rapidly in recent years, so that consumer demand for storage media have also rapidly increased. Rewritable non-volatile memory, such as flash memory, is one of the most adaptable memories for such battery-powered portable products due to its characteristics such as data non-volatility, low power consumption, small volume, and non-mechanical structure.

Furthermore, the user's increasing acceptance of electronic wallet and pre-deposit lead to the popularity of smart cards. A smart card is typically an integrated circuit (IC) chip which includes, for example, a microprocessor, a card operation system, a security module, and a memory module to allow holder of the smart card to perform preset operations. With the ability to provide computation, encryption, bidirectional communication and security functions, the smart card not only stores data but also protects the data stored therein. One exemplary application of the smart card is the subscriber identification module (SIM) of cellular phones that use global system for mobile communication (GSM). However, the smart card has a limit on the storage capacity. Thus, the smart card has recently begun to be combined with a large storage memory card to expand the storage capacity of the smart card.

Accordingly, how to identify whether a data stream from a host system is a command data unit belongs to a smart card chip and transmit response data unit from the smart card chip to the host system in a memory card equipped with a non-volatile memory module and the smart card chip is one of the important subjects.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a method of dispatching and transmitting data streams, and a memory controller and a memory storage apparatus using the same, which are capable of effectively transmitting data unit belonging to a smart card chip.

According to an exemplary embodiment of the present invention, a method of dispatching and transmitting data streams for a memory storage apparatus having a non-volatile memory module and a smart card chip is provided. The method includes configuring a plurality of logical block addresses for the non-volatile memory module, wherein a plurality of specific logical block addresses among the logical block addresses stores a specific file. The method also includes receiving a response data unit from the smart card chip and storing the response data unit in a buffer memory. The method still includes receiving a read command from a host system; determining whether a logical block address corresponding to the read command belongs to any one of the specific logical block addresses and determining whether the buffer memory stores the response data unit. The method further includes transmitting the response data unit stored in the buffer memory to the host system when the logical block address corresponding to the read command belongs to one of the specific logical block addresses and the buffer memory stores the response data unit.

According to an exemplary embodiment of the present invention, a method of dispatching and transmitting data streams for a memory storage apparatus having a non-volatile memory module and a smart card chip is provided. The method includes configuring a plurality of logical block addresses for the non-volatile memory module, wherein a plurality of specific logical block addresses among the logical block addresses stores specific files. The method also includes receiving a response data unit from the smart card chip and storing the response data unit in a buffer memory. The method still includes receiving a read command from a host system; determining whether a logical block address corresponding to the read command belongs to any one of the specific logical block addresses and determining whether the buffer memory stores the response data unit. The method also includes determining whether the logical block address corresponding to the read command is corresponding to an access address unit when the logical block address corresponding to the read command belongs to one of the specific logical block addresses and the buffer memory stores the response data unit. The method further includes transmitting a portion of the response data unit stored in the buffer memory to the host system when the logical block address corresponding to the read command is corresponding to the access address unit.

According to an exemplary embodiment of the present invention, a memory controller including a memory interface, a memory management circuit, a host interface and a buffer memory is provided. The memory interface is coupled to the memory management circuit and configured for accessing the above-mentioned memory module. The host interface is coupled to the memory management circuit and configured for coupling to a host system. The buffer memory is coupled to the memory management circuit and configured for temporarily storing data. The memory management circuit is configured for executing the above-mentioned method of dispatching and transmitting data streams.

According to an exemplary embodiment of the present invention, a memory storage apparatus including a connector, the above-mentioned non-volatile memory module and a memory controller coupled to the non-volatile memory module is provided. Herein the memory controller is configured for executing the above-mentioned method of dispatching and transmitting data streams.

Based on the above, the method of dispatching and transmitting data streams, and the memory controller and the memory storage apparatus using the same are capable of correctly transmitting command data units and response data units for the smart card chip.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
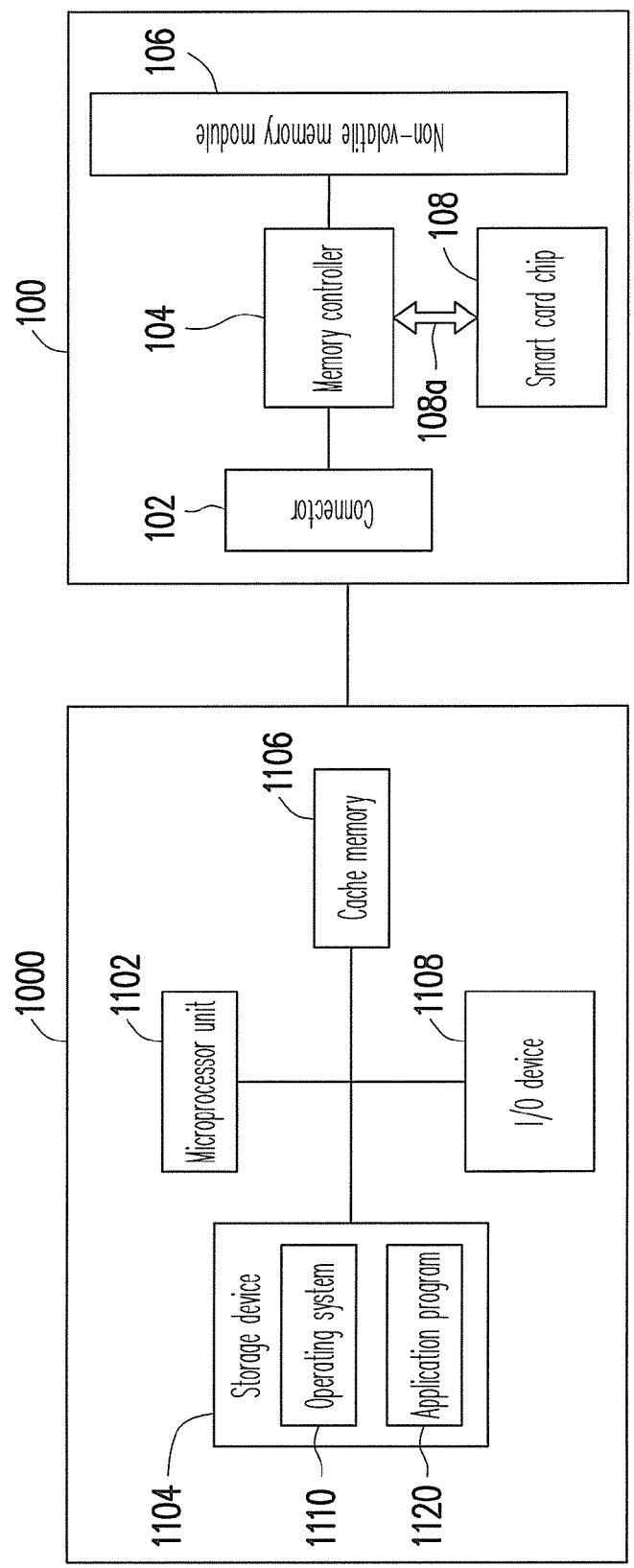
FIG. 1 is a schematic block diagram illustrating a host system and a memory storage apparatus according to a first exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

FIG. 1 is a schematic block diagram illustrating a host system and a memory storage apparatus according to a first exemplary embodiment of the present invention.

Referring to FIG. 1, the host system 1000 includes a microprocessor 1102, a storage device 1104, a cache memory 1106 and an input/output (I/O) device 1108. When the host system 1000 is enabled, an operating system 1110 installed in the storage device 1104 runs through the microprocessor 1102, so that the host system 1000 can provide corresponding functions according to manipulations by a user. For example, when the host system 1000 is a mobile phone system and the operating system 1110 is Symbian system, Android system or other operating system, a user can manipulate the host system 1000 through the I/O device 1108 to perform communication functions, media player functions and etc. after the host system 1000 is turned on. Even though the host system 1000 is described as a mobile phone system in the present exemplary embodiment, in another exemplary embodiment of the present invention, the host system 1000 may also be a computer, a digital camera, a video camera, a communication device, an audio player, or a video player, and etc.

A memory storage apparatus 100 is used for coupling to the host system 1000 to execute data writing and data reading according to commands from the operating system 1110 of the host system 1000. For example, if the host system 1000 is a mobile phone system, the memory storage apparatus 100 is then a Secure Digital (SD) card, a Multi Media Card (MMC) card, a memory stick, a Compact Flash (CF) card, or an embedded storage device. The embedded storage device includes an embedded MMC (eMMC). It should be noted that the eMMC is directly coupled to the substrate of the host system.

The memory storage apparatus 100 includes a connector 102, a memory controller 104 and a non-volatile memory module 106.

Herein, the connector 102 complies with the SD standards. However, the invention is not limited thereto, and the connector 102 may also complies with the serial advanced technology attachment (SATA) standards, the universal serial bus (USB) standards, the Institute of Electrical and Electronic Engineers (IEEE) 1394 standards, the peripheral component interconnect (PCI) express standards, the memory stick (MS) standards, the MMC standards, the CF standards, the integrated device electronics (IDE) standards, or other suitable standards.

The memory controller 104 executes a plurality of logic gates or control instructions implemented in a hardware form or a firmware form and performs various data operations in the non-volatile memory module 106 according to commands of the host system 1000, such as data writing, reading, and erasing.

The non-volatile memory module 106 is coupled to the memory controller 104 and configured for storing data written by the host system 1000. The non-volatile memory module 106 includes a plurality of physical blocks. Each of the physical blocks has a plurality of physical pages, wherein the physical pages belonging to the same physical block can be written individually and must be erased simultaneously. In detail, each physical block is the smallest erasing unit. Namely, each physical block contains the least number of memory cells that are erased together. And, one physical page is the smallest programming unit. Namely, each physical page is the smallest unit for writing data. However, it should be noted that in another exemplary embodiment, the smallest unit for writing data may be one sector or other size.

In the memory management method of the first exemplary embodiment of the present invention, the memory controller 104 groups the physical blocks of the non-volatile memory module 106 into a data area, a spare area, a system area and replacement area. The physical blocks of the data area and the spare area are alternated to store data written by the host system 1000. The physical blocks of the system area are used for storing system data of the memory storage apparatus 100. And, the physical blocks of the replacement area are used for replacing bad physical blocks in the data area and spare area. In order to allow the host system 1000 to successfully access the physical blocks that are alternatively used to store data described above, the memory controller 104 configures logical block addresses LBA(0)~LBA(N) for mapping to these physical blocks, and thereby the host system can write or read data directly according to the logical block addresses.

In this exemplary embodiment, the non-volatile memory module 106 is a rewritable non-volatile memory module. For example, the non-volatile memory module 106 is a multi-level cell (MLC) NAND flash memory module. However, the present invention is not limited thereto, and the non-volatile memory module 106 may also be a single level cell (SLC) NAND flash memory module, other flash memory module or other memory module having the same characteristic.

In the first exemplary embodiment of the present invention, the memory storage apparatus 100 still includes a smart card chip 108. The smart card chip 108 is coupled to the memory controller 104 through an interface 108a, wherein the interface 108a is a specific interface for communicating with the smart card chip 108. The smart card chip 108 has a microprocessor, a security module, a read-only memory (ROM), a random access memory (RAM), an electrically erasable programmable read-only memory (EEPROM), an oscillator and etc. The microprocessor is used for controlling the whole operation of the smart card chip 108. The security module is used for encrypting/decrypting data stored in the smart card chip 108. The oscillator is used for generating clock signals needed for the operation of the smart card chip 108. The random access memory is used for temporarily storing data or firmware codes. The electrically erasable programmable read-only memory is used for storing user data. The read only memory is used for storing the firmware codes of the smart card chip 108. To be specific, when the smart card chip 108 is operated, the microprocessor executes the firmware codes in the read only memory to perform related operations.

In particular, the security module of the smart card chip 108 may perform a security mechanism for preventing an attack of stealing data stored in the smart card chip 108. For example, the attack may be a timing attack, a single-power-analysis attack or a differential-power-analysis. Additionally, the security mechanism performed by the smart card chip 108 complies with a third or higher level of Federal Information Processing Standards (FIPS) 140-2 or a third or higher level of EMV EL. That is, the smart card chip 108 passes the certification of the third or higher level of FIPS 140-2 or the third or higher level of EMV EL. Herein, FIPS is an open standard that is made by American Federal Government for government organizations and contractors thereof, besides military organizations. Additionally, EMV is a standard which is made by international finance industries for smart cards, terminals of point-of-sales which can identify chip cards, and automatic teller machines. This standard is established for hardware and software equipments of a payment system aiming at chip credit cards and cash cards. In the present exemplary embodiment, by the operations of the smart card chip 108, the memory storage apparatus 100 is capable of being used for services needed an identification, such as a payment service or a certification service.

Figure 2:
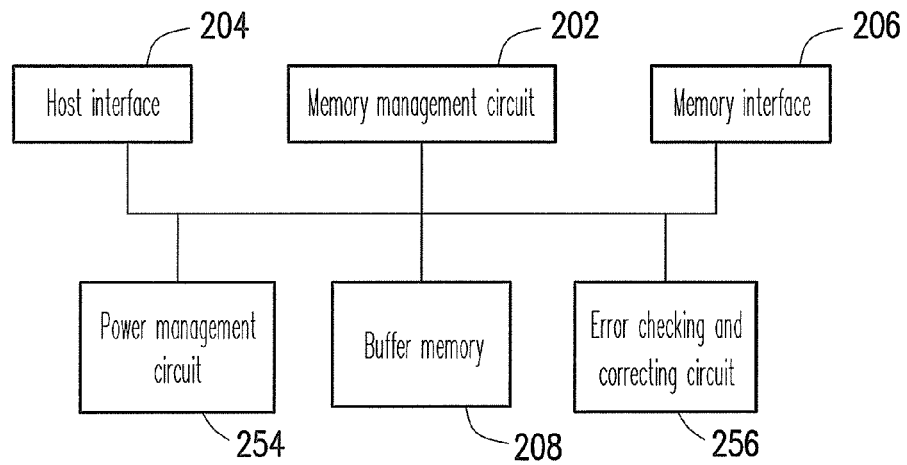
FIG. 2 is a schematic block diagram of a memory controller according to the first exemplary embodiment of the present invention.

FIG. 2 is a schematic block diagram of a memory controller according to the first exemplary embodiment of the present invention.

Referring FIG. 2, the memory controller 104 includes a memory management circuit 202, a host interface 204, a memory interface 206 and a buffer memory 208.

The memory management circuit 202 is configured for controlling the whole operation of the memory controller 104. To be specific, the memory management circuit 202 has a plurality of control instructions, and the control instructions are executed to manage the non-volatile memory module 106 according to the method of dispatching and transmitting data streams and the memory management method described in the first exemplary embodiment when the memory storage apparatus 100 is operated.

In the present exemplary embodiment, the control instructions of the memory management circuit 202 are implemented in a firmware form. For example, the memory management circuit 202 has a micro-processor unit (not shown) and a read-only memory (not shown), and these control instructions are burned in the read-only memory. When the memory storage apparatus 100 is operated, the control instructions are executed by the micro-processor unit to accomplish the method of dispatching and transmitting data streams and the memory management method according to the present exemplary embodiment.

In another exemplary embodiment of the invention, the control instructions of the memory management circuit 202 are stored in a specific area (for example, the system area in a memory module exclusively used for storing system data) of the non-volatile memory module 106 as program codes. Additionally, the memory management circuit 202 may have a micro-processor unit (not shown), a read-only memory (not shown) and a random access memory (not shown). And, the read-only memory has a driver code, and when the memory controller 104 is enabled, the micro-processor unit executes the driver code to load the control instructions of the memory management circuit 202 stored in the non-volatile memory module 106 into the random access memory of the memory management circuit 202. Then, the micro-processor unit runs these control instructions to accomplish the method of dispatching and transmitting data streams and the memory management method according to the present exemplary embodiment. Additionally, the control instructions of the memory management circuit 202 may be implemented in a hardware form.

The host interface 204 is coupled to the memory management circuit 202, and configured for receiving and identifying commands and data from the host system 1000. Namely, the commands and data from the host system 1000 are transmitted to the memory management circuit 202 through the host interface 204. In the present exemplary embodiment, the host interface 204 complies with the SD standards. However, it should be understood that the present invention is not limited thereto, and the host interface 204 may comply with the MS standards, the MMC standards, the CF standards, the PATA standards, the IEEE 1394 standards, the PCI Express standards, the SATA standards, the USB standards, the IDE standards or other suitable standards.

The memory interface 206 is coupled to the memory management circuit 202 and configured for accessing the non-volatile memory module 106. Namely, data to be written into the non-volatile memory module 106 is converted by the memory interface 206 into a format acceptable to the non-volatile memory module 106.

The buffer memory 208 is coupled to the memory management circuit 202 and configured to temporarily store data and commands from the host system 1000 or data from the non-volatile memory module 106.

In another exemplary embodiment of the present invention, the memory controller 104 still includes a power management circuit 254. The power management circuit 254 is coupled to the memory management circuit 202 and configured for controlling the power of the memory storage apparatus 100.

In another exemplary embodiment of the present invention, the memory controller 104 still includes an error checking and correcting circuit 256. The error checking and correcting circuit 256 is coupled to the memory management circuit 202, and configured for executing an error checking and correcting procedure to ensure data accuracy. To be specific, when the memory management circuit 202 receives a write command from the host system 1000, the error checking and correcting circuit 256 generates an error checking and correcting (ECC) code for data corresponding to the write command, and the memory management circuit 202 writes the data and the corresponding ECC code into the non-volatile memory module 106. Subsequently, when the memory management circuit 202 reads the data from the non-volatile memory module 106, the memory management circuit 202 simultaneously reads the corresponding ECC code, and the error checking and correcting circuit 256 executes the ECC procedure for the read data based on the corresponding ECC code.

It should be mentioned that the smart card chip 108 receives commands and data from the host system 1000 and transmits data to the host system 1000 via the connector 102 of the memory storage apparatus 100, but not communicates with the host system 1000 directly via a smart card interface (i.e., the interface 108a). Accordingly, in the first exemplary embodiment of the present invention, an application program 1120 is installed in the host system 1000 to process command data units to be transmitted to the smart card chip 108 and identify response data units from the smart card chip 108. For example, in the present exemplary embodiment, a command data unit transmitted to the smart card chip 108 is referred to as a Command-Application Protocol Data Unit (C-APDU) and a response data unit from the smart card chip 108 is referred to as a Response-Application Protocol Data Unit (R-APDU). In particular, the memory controller 104 identifies and transmits a C-APDU and an R-APDU for the smart card chip 108 according to the method of dispatching and transmitting data streams of the first exemplary embodiment. That is, when the host system 1000 operates with the memory storage apparatus 100 having the non-volatile memory module 106 and the smart card chip 108, the memory controller 104 cooperates with the application program 1120 to transmit and dispatch a C-APDU to be given to the smart card chip 108 to correctly transmit data streams belonging to the C-APDU to the smart card chip 108 according to the method of dispatching and transmitting data streams. And, the memory controller 104 returns the R-APDU corresponding to the C-APDU from the smart card chip 108 to the host system 1000 according to the method of dispatching and transmitting data streams.

Figure 3:
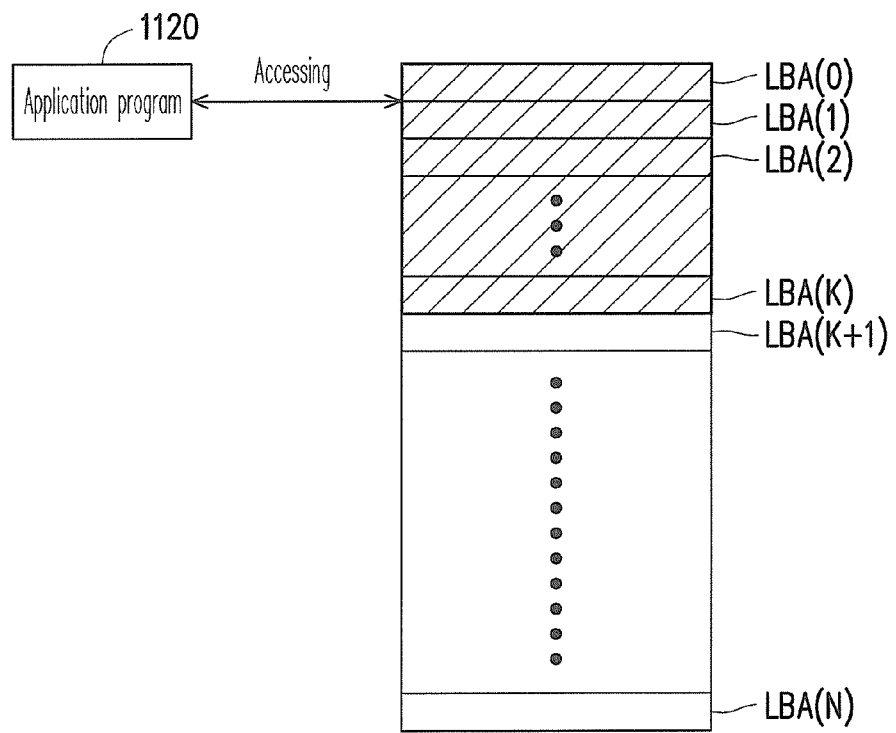
FIG. 3 is a diagram illustrating an example of accessing a specific file by an application program according to the first embodiment of the present invention.

In the present exemplary embodiment, the application program 1120 stores one or more files and passes information about the logical block addresses storing the one or more files to the memory controller 104. For example, when the application program 1120 gives a command for storing a file RF in the memory storage apparatus 100, the operating system 1110 uses a portion of the logical block addresses (e.g., the logical block addresses LBA(0)~LBA(K)) to write the file RF according to a file system (not shown) of the memory storage apparatus 100. Herein, the logical block addresses used for storing the file RF are referred to as specific logical block addresses (as oblique lines shown in FIG. 3) and the file RF is referred to as a specific file.

In particular, in the present exemplary embodiment, any operation for the smart card chip 108 is accomplished by accessing the file RF through the application program 1120. That is, the application program 1120 may transmit a C-APDU to the memory storage apparatus 100 through a write command for writing the file RF and read an R-APDU from the memory storage apparatus 100 through a read command for reading the file RF. It should be noted that in other operating system, the application program 1120 may also access directly the specific logical block addresses corresponding to the file RF, thereby executing the operations for the smart card chip 108.

To be specific, the memory management circuit 202 of the memory controller 104 includes a state machine and updates the state of the state machine according to the operations for the smart card chip 108 by the host system 1000. Additionally, when the application program 1120 accesses the file RF, the memory controller 104 determines whether a data stream from the host system 1000 should be transmitted to the smart card chip 108 or a response message from the smart card chip 108 should be transmitted to the host system 1000 according to the state of the state machine.

Figure 4:
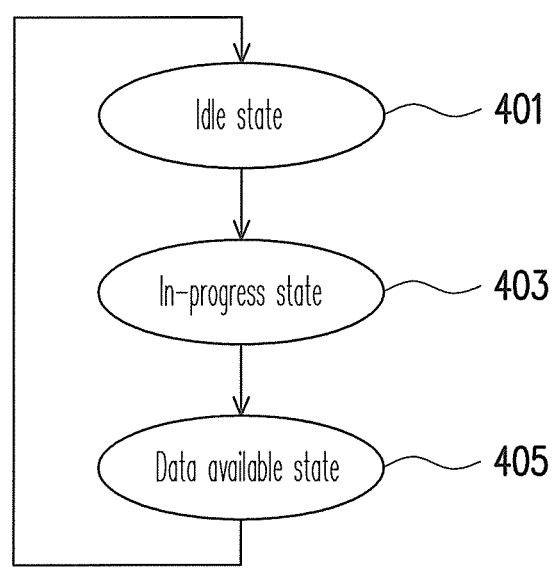
FIG. 4 is a diagram illustrating a state machine according to the first exemplary embodiment of the present invention.

FIG. 4 is a diagram illustrating a state machine according to the first exemplary embodiment of the present invention.

Referring to FIG. 4, when the memory storage apparatus 100 is enabled, the state machine is at an idle state 401. During the idle state 401, the memory controller 104 determines whether a write command from the host system 1000 is corresponding to the specific logical block addresses and whether a data stream (referred to as the first data stream hereinafter) corresponding to the write command contains a specific mark. To be specific, when a C-APDU is about to be transmitted to the memory storage apparatus 100, the application program 1120 encapsulates the specific mark and the C-APDU into a data stream to be written into the file RF and the operating system 1110 gives a write command to the memory storage apparatus 100 for writing this data stream into the specific logical block addresses. For example, this specific mark is recorded in the header of this data stream. Accordingly, when the memory storage apparatus 100 receives this write command and this data stream, the memory management circuit 202 identifies that the received data stream is corresponding to the specific logical block addresses and contains the specific mark, thereby dispatching the received data stream to the smart card chip 108.

After the memory management circuit 202 transmits a C-APDU to the smart card chip 108, the state of the state machine will be at an in-progress state 403. During the in-progress state 403, the memory controller 104 will wait for a corresponding R-APDU from the smart card chip 108. That is, the in-progress state 403 represents that the memory controller 202 has not yet received an R-APDU from the smart card chip 108. If the application program 1120 gives a read command for reading the file RF during the in-progress state 403, the memory management circuit 202 returns a default data stream (referred to as the second data stream hereinafter) to the host system 1000. In the present exemplary embodiment, the memory controller 104 and the application program 1120 both transmits command data units of the smart card chip 108 based on an access address unit. For example, in the present exemplary embodiment, this access address unit is 8 kilobytes (KB) and therefore the second data stream is designed to have the size that is 8 KB and each bit thereof is 0. In particular, when receiving the second data stream, the application program 1120 identifies that the corresponding R-APDU is not received successfully and then tries to receive the corresponding R-APDU from the memory storage apparatus 100 by repeatedly polling.

After receiving the R-APDU from the smart card chip 108, the state of the state machine becomes a data available state 405 from the in-progress state 403. During the data available state 405, the memory controller 104 will wait for a read command for reading the specific logical block address from the host system 1000. To be specific, the memory management circuit 202 stores an R-APDU received from the smart card chip 108 in the buffer memory 208, and transmits the stored R-APDU to the host system 1000 in response to a read command corresponding to the specific logical block addresses. In particular, after transmitting the stored R-APDU to the host system 1000, the state of the state machine becomes the idle state 401 from the data available state 405. Accordingly, the memory controller 104 may receive next C-APDU from the host system 1000 and dispatch it to the smart card chip 108.

In the present exemplary embodiment, the transmission of data between the memory storage apparatus 100 and the host system 1000 is performed through the cache memory 1106. To be specific, when the host system 1000 reads data from the memory storage apparatus 100, the operating system 1110 of the memory storage apparatus 100 uses a pre-fetching manner to read data, thereby increasing the performance. For example, when the application program 1120 of the host system 1000 is about to read 8K of data started from the logical block address LBA(0) of the memory storage apparatus 100, the operating system 1110 of the host system 1000 may read 64K of data started from the logical block address LBA(0) of the memory storage apparatus 100 and stores the read data in the cache memory 1106. Accordingly, if data to be read by next read command has stored in the cache memory 1106, the operating system 1110 of the host system 1000 read the data directly from the cache memory 1106, thereby shortening the time for reading the data.

It should be noted that in order to successfully transmit the R-APDU of the smart card chip 108 in the case where data is transmitted to the host system 1000 through the cache memory 1106, the size of the file RF is designed to be larger than the size of the cache memory 1106. Accordingly, whenever the application program 1120 reads the file RF, the operating system 1110 must actually read data from the memory storage apparatus 100.

Figure 5:
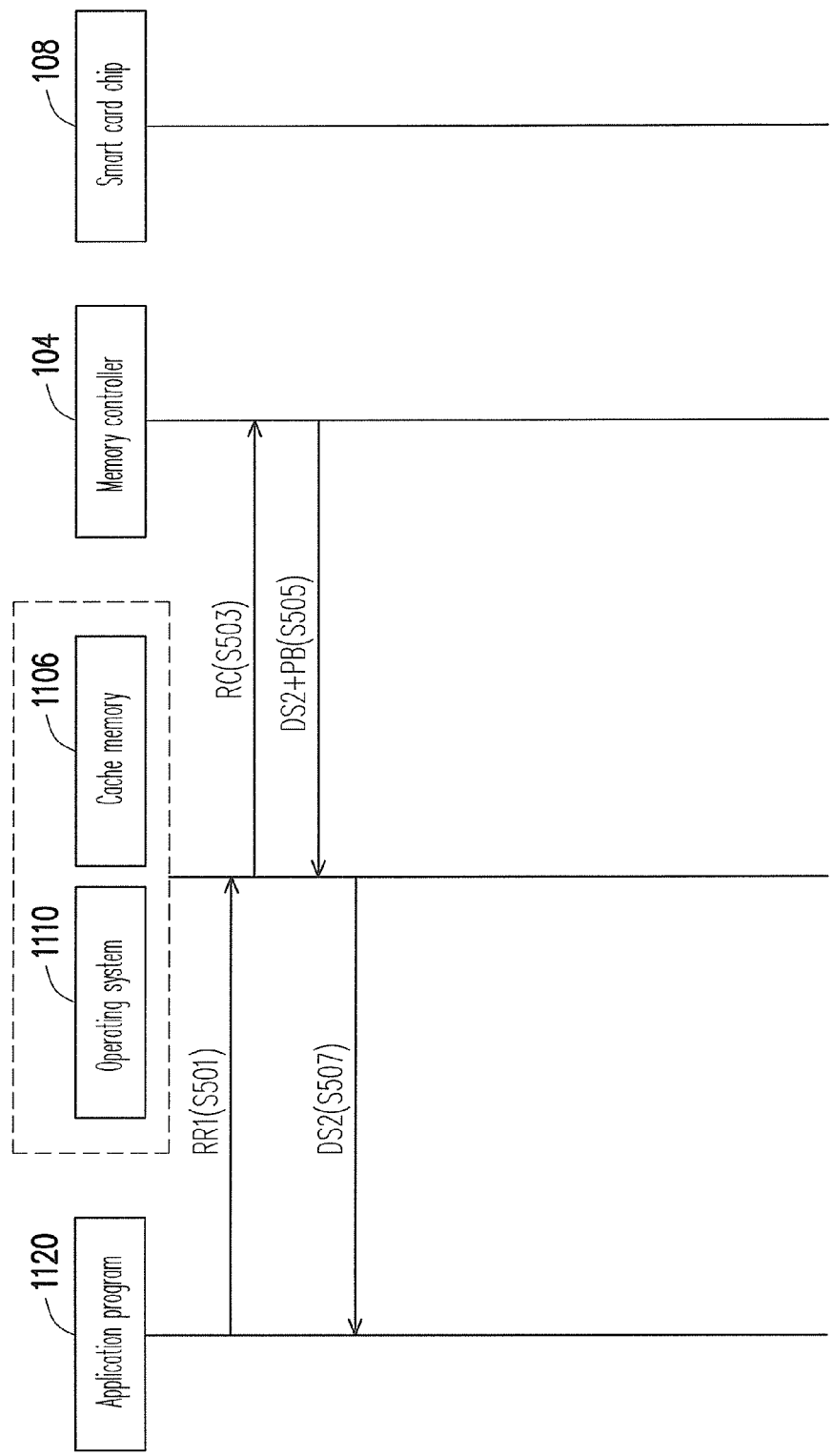
FIG. 5 is a data flow diagram of pre-fetching according to the first embodiment of the present invention.

FIG. 5 is a data flow diagram of pre-fetching according to the first exemplary embodiment of the present invention, wherein it is assumed that the operating system 1110 gives a read command and the memory controller 104 has not yet received a corresponding R-APDU from the smart card chip 108.

Referring to FIG. 5, the application program 1120 transmits a read request RR1 to the operating system 1110 (data flow S501), wherein the read request RR1 is used for requesting to read 8K of data started from the specific logical block address LBA(0).

It is assumed that the cache memory 1106 does not store data corresponding to the specific logical block address LBA (0), so the operating system 1110 transmits a read command RC to the memory controller 104 with the pre-fetching manner (data flow S503), wherein the read command RC is used for instructing to read 64 KB of data started from the specific logical block address LBA(0).

Because a corresponding R-APDU has not yet been gotten at this time, the memory controller 104 transmits the second data stream DS2 to the host system 1000 (data flow S505). It should be noted that because the size of the second data stream DS2 is 8 KB, in order to reply to the read command RC for reading 64 KB of data started from the specific logical block address LBA(0), the memory controller 104 adds 56 KB of pad bits PB following the second data stream DS2 and transmits a data stream composed of the second data stream DS2 and the pad bits PB to the host system 1000. Accordingly, the data stream composed of the second data stream DS2 and the pad bits PB is stored in the cache memory 1106.

Then, the operating system 1110 transmits front 8 KB of data (i.e., the second data stream) in the cache memory 1106 to the application program 1120 (data flow S507).

Figure 6:
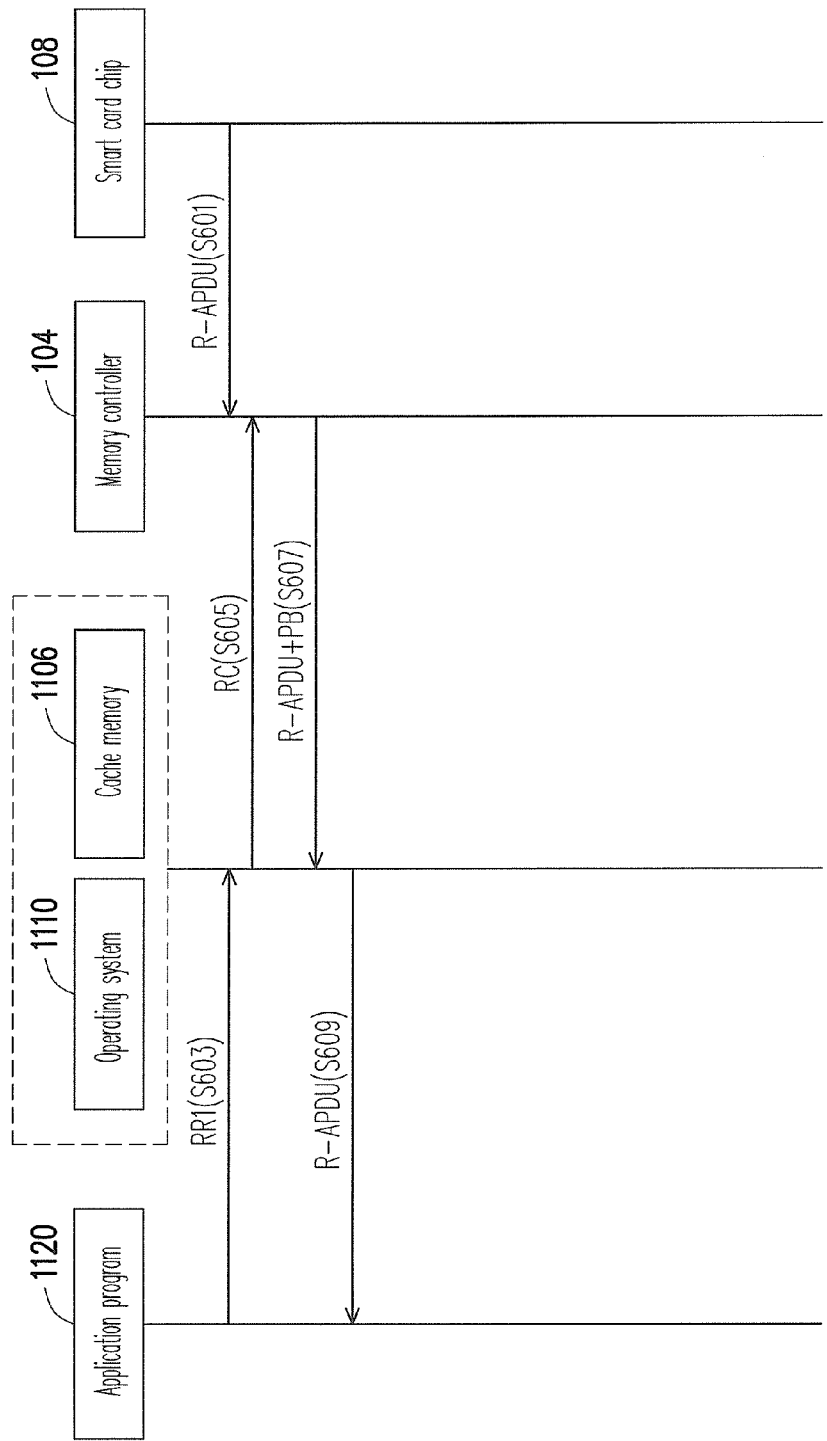
FIG. 6 is another data flow diagram of pre-fetching according to the first embodiment of the present invention.

FIG. 6 is a data flow diagram of pre-fetching according to the first exemplary embodiment of the present invention, wherein it is assumed that the operating system 1110 gives a read command and the memory controller 104 has received a corresponding R-APDU from the smart card chip 108.

Referring to FIG. 6, in data flow S601, the smart card chip 108 transmits an R-APDU to the memory controller 104.

In data flow 5603, the application program 1120 transmits a read request RR1 to the operating system 1110, wherein the read request RR1 is used for requesting to read 8K of data started from the specific logical block address LBA(0).

It is assumed that the cache memory 1106 does not store data corresponding to the specific logical block address LBA (0), so the operating system 1110 transmits a read command RC to the memory controller 104 with the pre-fetching manner (data flow S605), wherein the read command RC is used for instructing to read 64 KB of data started from the specific logical block address LBA(0).

Because the corresponding R-APDU has been gotten at this time, the memory controller 104 transmits the R-APDU to the host system 1000 (data flow S607). It should be noted that because the size of the R-APDU is 8 KB, in order to reply to the read command RC for reading 64 KB of data started from the specific logical block address LBA(0), the memory controller 104 adds 56 KB of pad bits PB following the R-APDU and transmits a data stream composed of the R-APDU and the pad bits PB to the host system 1000. Accordingly, the data stream composed of the R-APDU and the pad bits PB is stored in the cache memory 1106.

After that, the operating system 1110 transmits front 8 KB of data (i.e., the R-APDU) in the cache memory 1106 to the application program 1120 (data flow S609).

It should be noted that though the above-mentioned pre-fetching is performed by using one read command, in the present exemplary embodiment, the operating system 1110 may use a plurality of read commands to perform the pre-fetching sometimes. For example, when the application program 1120 of the host system 1000 is about to read 8K of data started from the logical block address LBA(0) of the memory storage apparatus 100, the operating system 1110 of the host system 1000 may read 64K of data started from the logical block address LBA(0) by giving two read commands. For example, the operating system 1110 may give a first read command for reading 0.5 KB of data and then give a second read command for reading 63.5 KB of data following the data read by the first read command.

Figure 7:
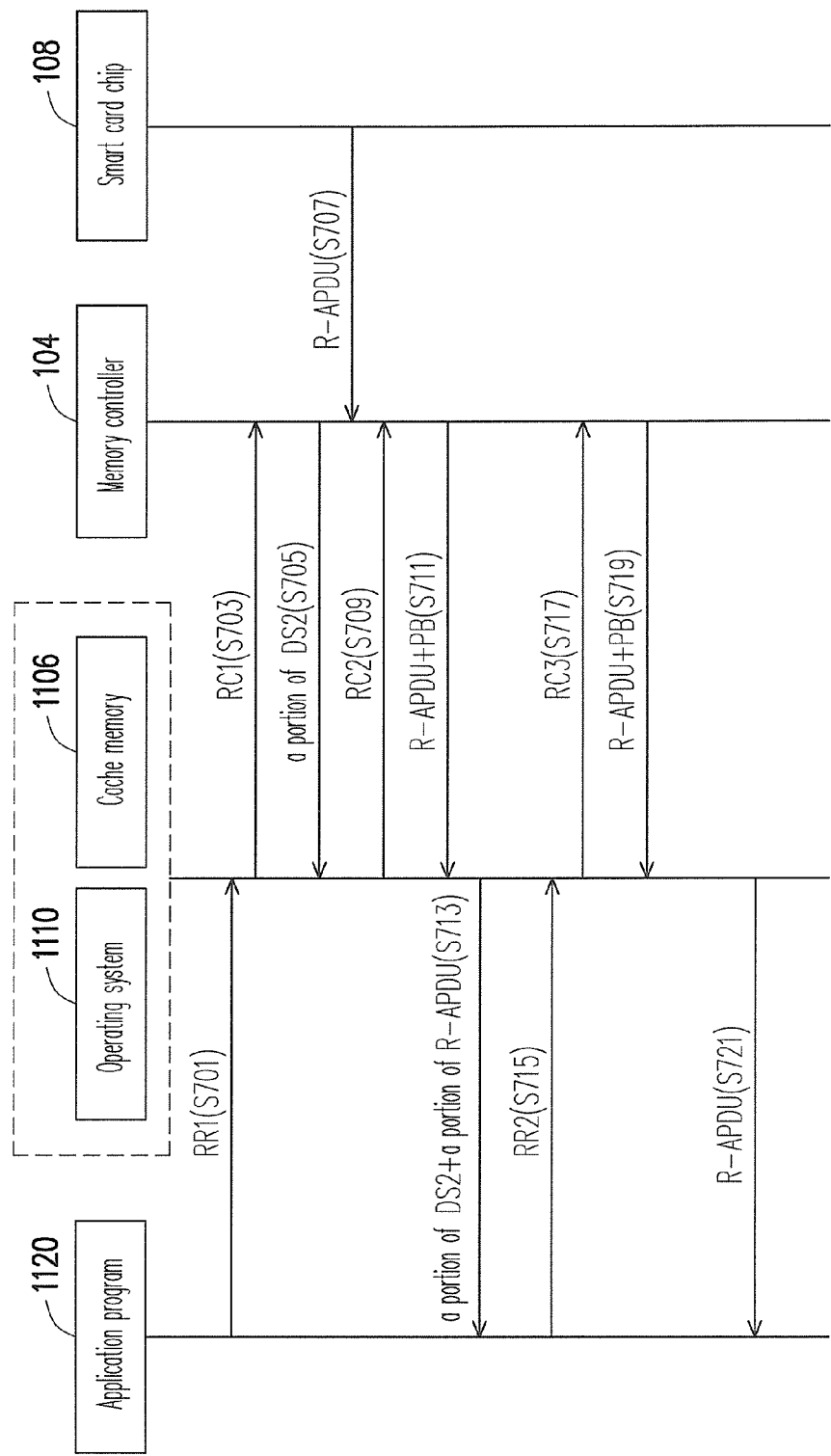
FIG. 7 is another data flow diagram of pre-fetching according to the first embodiment of the present invention.

FIG. 7 is a data flow diagram of pre-fetching according to the first exemplary embodiment of the present invention, wherein it is assumed that the memory controller 104 receives a corresponding R-APDU from the smart card chip 108 during the operating system 1110 reads data with the pre-fetching manner.

Referring to FIG. 7, in data flow 5701, the application program 1120 transmits a read request RR1 to the operating system 1110, wherein the read request RR1 is used for requesting to read 8K of data started from the specific logical block address LBA(0).

It is assumed that the cache memory 1106 does not store data corresponding to the specific logical block address LBA(0), so the operating system 1110 transmits read commands to the memory controller 104 with the pre-fetching manner, wherein the read commands are used for instructing to read 64 KB of data started from the specific logical block address LBA(0). In data flow S703, the operating system 1110 first reads 0.5 KB of data by giving a read command RC1.

Because a corresponding R-APDU has not yet been gotten at this time, the memory controller 104 transmits the second data stream DS2 to the host system 1000 (data flow S705). It should be noted that because the size of the second data stream DS2 is 8 KB, in order to reply to the read command RC1 for reading 0.5 KB of data started from the specific logical block address LBA(0), the memory controller 104 transmits only front 0.5 KB of data among the second data stream DS2 to the host system 1000.

In data flow S707, the memory controller 104 receives an R-APDU from the smart card chip 108.

After that, in data flow S709, the operating system 1110 reads following 63.5 KB of data by giving a read command RC2.

Because the corresponding R-APDU has been gotten at this time, the memory controller 104 transmits the R-APDU to the host system 1000 (data flow S711). It should be noted that because the size of the R-APDU is 8 KB, in order to reply to the read command RC2 for reading 63.5 KB of data started from the specific logical block address LBA(0), the memory controller 104 adds 55.5 KB of pad bits PB following the R-APDU and transmits data stream composed of the R-APDU and the pad bits PB to the host system 1000. Accordingly, a data stream containing a portion of the second data stream DS2, the R-APDU and the pad bits PB is stored in the cache memory 1106.

After that, the operating system 1110 transmits front 8 KB of data in the cache memory 1106 to the application program 1120 (data flow S713).

It should be mentioned that because among the transmitted 8 KB of data, the front 0.5 KB of data is a portion of the second data stream DS2 and the following 7.5 KB of data is a portion of the R-APDU, the application program 1120 will receive an incomplete R-APDU. In particular, after the memory management circuit 202 of the memory controller 104 transmits a R-APDU, the state of the state machine becomes the idle state, as shown in FIG. 4, thereby representing that the transmission of a C-APDU transmitted by the application program 1120 and a corresponding R-APDU replied by the smart card chip 108 is completed. However, at this time, the application program 1120 may identify that the received R-APDU is incomplete by an error detecting technology and re-send a request for reading an R-APDU.

In order to solve the above-mentioned problem, in the present exemplary embodiment, the memory management circuit 202 does not delete the R-APDU stored in the buffer memory 208 instantly after the stored R-APUD is transmitted to the host system 1000. For example, the memory management circuit 202 may delete the stored R-APDU when receiving next C-APDU. Additionally, when the memory storage apparatus 100 receives a read commend corresponding to the specific logical block addresses from the host system 1000 during the idle state 401, the memory management circuit 202 transmits the R-APDU stored in the buffer memory 208 to the host system 1000 again.

Referring to FIG. 7 again, in data flow 5715, the application program 1120 transmits a read request RR2 to the operating system 1100, wherein the read request RR2 is used for requesting to read 8K of data started from the specific logical block address LBA(0). In data flow 5717, the operating system 1110 read 64 KB of data by giving a read command RC3.

Because the corresponding R-APDU has been stored in the buffer memory 208, the memory controller 104 transmits the R-APDU and 56 KB of pad bits PB to the host system 1000 (data flow S719).

After that, the operating system 1110 transmits front 8 KB of data in the cache memory 1106 to the application program 1120 (data flow S721). Accordingly, when the operating system 1000 gives one read command for pre-fetching data later, the application program 1120 will get the correct R-APDU.

Figure 8:
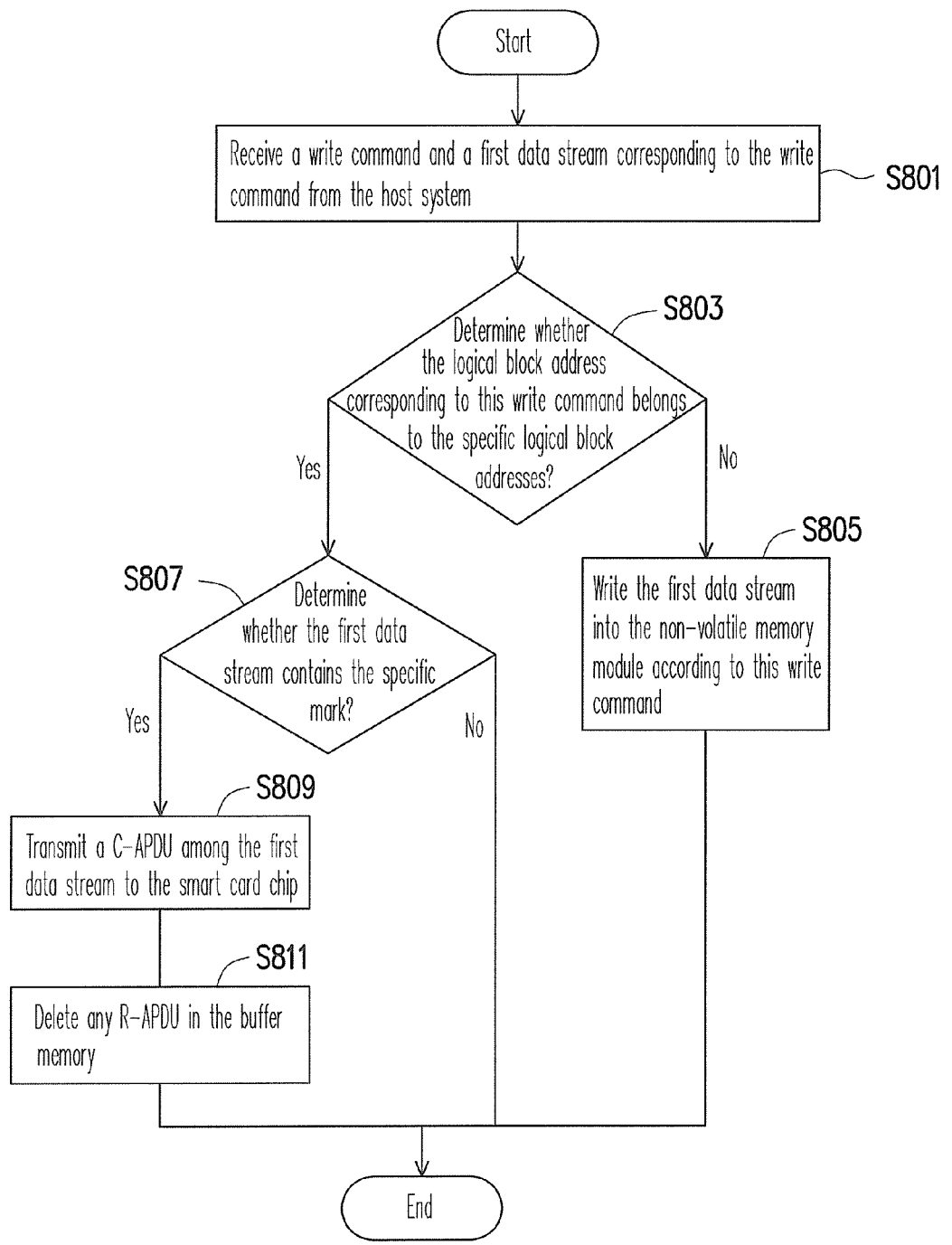
FIG. 8 is a flowchart of executing a write command according to the method of dispatching and transmitting data streams of the first exemplary embodiment.

FIG. 8 is a flowchart of executing a write command according to the method of dispatching and transmitting data streams of the first exemplary embodiment.

Referring to FIG. 8, in step S801, the memory management circuit 202 of the memory controller 104 receives a write command and a first data stream corresponding to the write command from the host system 1000.

In step S803, the memory management circuit 202 determines whether the logical block address corresponding to this write command belongs to the specific logical block addresses.

If the logical block address corresponding to the write command does not belong to the specific logical block addresses, in step S805, the memory management circuit 202 writes the first data stream into the non-volatile memory module 106 according to this write command. If the logical block address corresponding to the write command belongs to the specific logical block addresses, in step S807, the memory management circuit 202 determines whether the first data stream contains the specific mark.

If the first data stream contains the specific mark, in step S809, the memory management circuit 202 transmits a C-APDU (i.e., the portion of the first data stream without the specific mark) among the first data stream to the smart card chip 108 and in step S811, the memory management circuit 202 deletes any R-APDU in the buffer memory 208. In particular, at this time, the state of the state machine becomes the in-progress state 403 from the idle state 401. If it, in step S807, determines that the first data stream does not contain the specific mark, the process of FIG. 8 is terminated.

Figure 9:
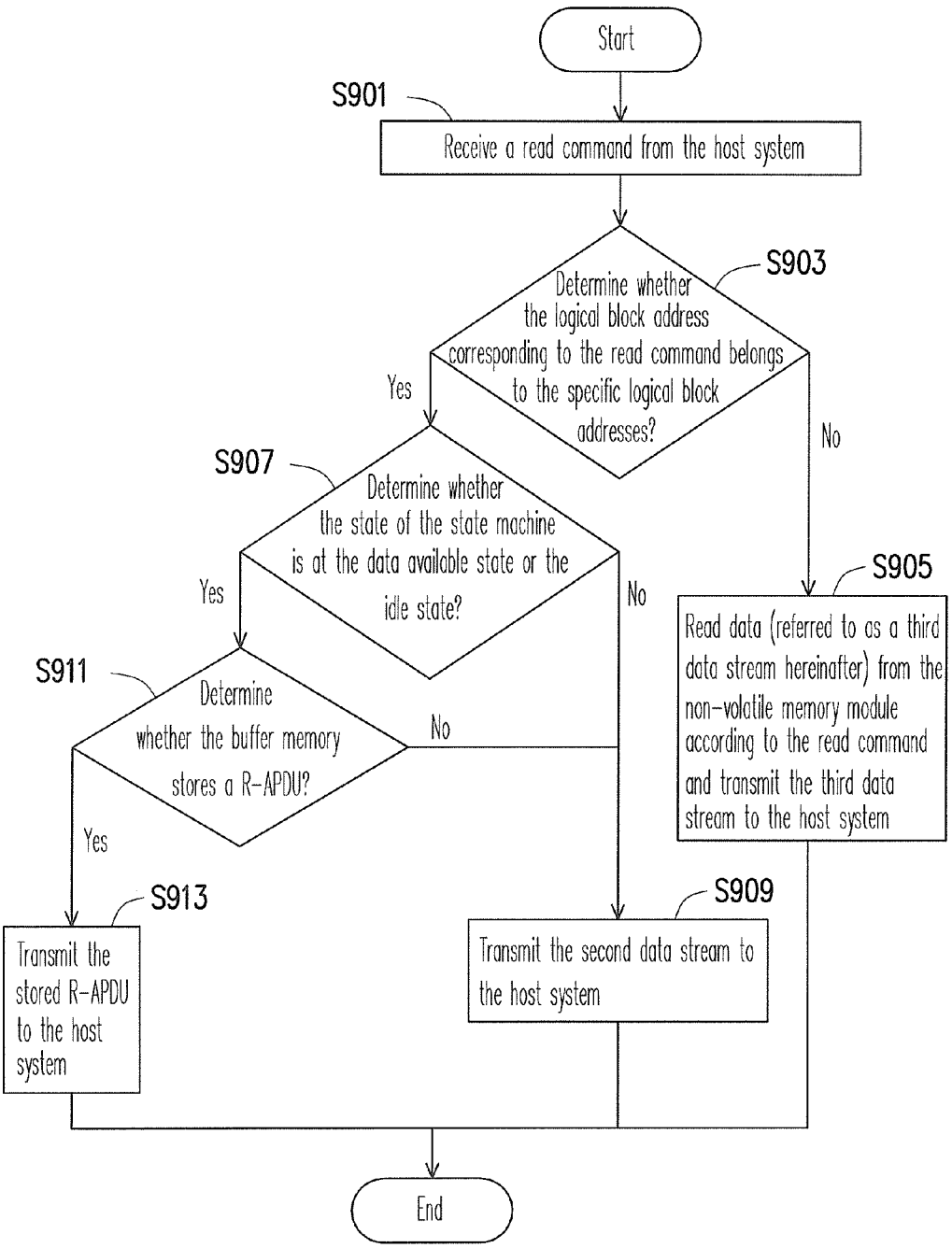
FIG. 9 is a flowchart of executing a read command according to the method of dispatching and transmitting data streams of the first exemplary embodiment.

FIG. 9 is a flowchart of executing a read command according to the method of dispatching and transmitting data streams of the first exemplary embodiment.

Referring to FIG. 9, in step S901, the memory management circuit 202 of the memory controller 104 receives a read command from the host system 1000.

In step S903, the memory management circuit 202 determines whether the logical block address corresponding to the read command belongs to the specific logical block addresses.

If the logical block address corresponding to the read command does not belong to the specific logical block addresses, in step S905, the memory management circuit 202 reads data (referred to as a third data stream hereinafter) from the non-volatile memory module 106 according to the read command and transmits the third data stream to the host system 1000. If the logical block address corresponding to the read command belongs to the specific logical block addresses, in step S907, the memory management circuit 202 determines whether the state of the state machine is at the data available state 405 or the idle state 401.

If the state of the state machine is not at the data available state 405 or the idle state 401, in step S909, the memory management circuit 202 transmits the second data stream to the host system 1000.

If the state of the state machine is at the data available state 405 or the idle state 401, in step S911, the memory management circuit 202 determines whether the buffer memory 208 stores an R-APDU.

If the buffer memory 208 does not store any R-APDU, step S909 is performed. If the buffer memory 208 stores the R-APDU, in step S913, the memory management circuit 202 transmits the stored R-APDU to the host system 1000. The manners of transmitting the second data stream and the R-APDU have explained above with FIG. 5, FIG. 6 and FIG. 7 and are not repeatedly described herein.

Second Exemplary Embodiment

A memory storage apparatus and a host system in the second exemplary embodiment essentially are similar to the memory storage apparatus and the host system described in the first exemplary embodiment, wherein the difference is a memory controller in the second exemplary embodiment uses different manners to dispatch and transmit an R-APDU from the smart card chip. The second exemplary embodiment is described below with FIGS. 1~3.

In the second exemplary embodiment, when a logical block address corresponding to a read command received from the host system 1000 belongs to the specific logical block addresses, the memory controller 104 determines whether the logical block address corresponding to the read command is a multiple of the above-mentioned access address unit. And, if the logical block address corresponding to the read command is not a multiple of the above-mentioned access address unit, the memory controller 104 identifies that the host system 1000 uses a plurality of read commands for per-fetching data. Accordingly, the memory controller 104 gets a corresponding segment among the R-APDU according to the read command and transmits the corresponding segment to the host system 1000.

Figure 10:
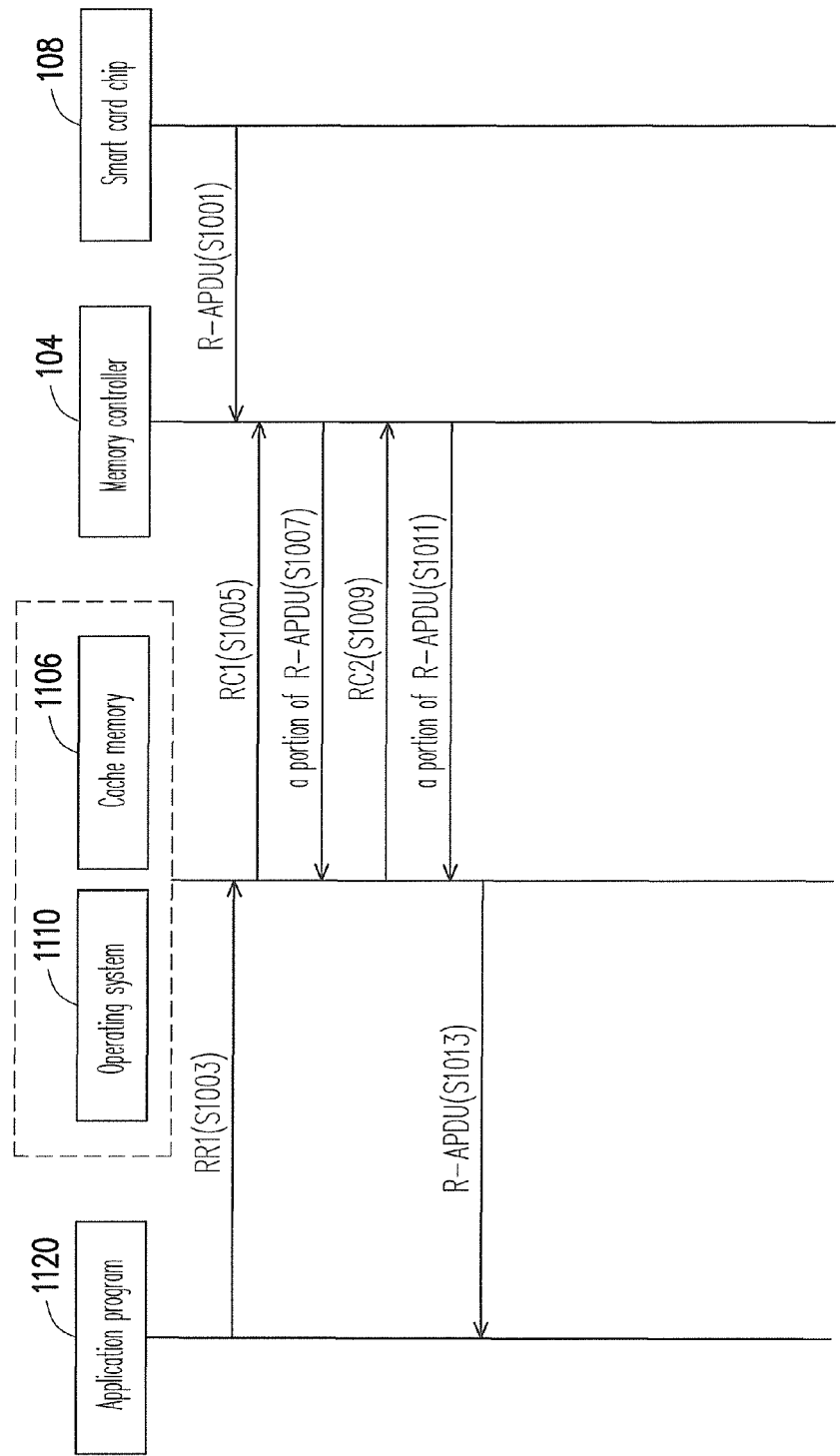
FIG. 10 is a data flow diagram of pre-fetching according to a second exemplary embodiment of the present invention.

FIG. 10 is a data flow diagram of pre-fetching according to the second embodiment of the present invention, wherein it is assumed that the memory controller 104 has received a corresponding R-APDU from the smart card chip 108 before the operating system 1110 gives a read command.

Referring to FIG. 10, in data flow S1001, the smart card chip 108 transmits an R-APDU to the memory controller 104.

In data flow S1003, the application program 1120 transmits a read request RR1 to the operating system 1110, wherein the read request RR1 is used for requesting to read 8K of data started from the specific logical block address LBA(0).

It is assumed that the cache memory 1106 does not store data corresponding to the specific logical block address LBA(0), so the operating system 1110 transmits read commands to the memory controller 104 with the pre-fetching manner, wherein the read commands are used for instructing to read 64 KB of data started from the specific logical block address LBA(0). In data flow S1005, the operating system 1110 first reads front 0.5 KB of data by giving a read command RC1.

Because the corresponding R-APDU has been stored in the buffer memory 208, the memory controller 104 transmits the front 0.5 KB of data among the R-APDU to the host system 1000 (data flow S1007).

After that, in data flow S1009, the operating system 1110 reads following 63.5 KB of data by giving a read command RC2.

At this time, the memory controller 104 identifies that the logical block address corresponding to the read command RC2 is not a multiple of the access address unit. Therefore, the memory controller 104 transmits the following 7.5 KB of data among the R-APDU to the host system 1000 (data flow S1011). Similarly, the memory controller 104 adds 56 KB of pad bits PB following the 7.5 KB of the R-APDU in response to the read command RC2 for reading 63.5 KB of data.

After that, the operating system 1110 transmits front 8 KB of data (i.e., the R-APDU) in the cache memory 1106 to the application program 1120 (data flow S1013).

Accordingly, in the second exemplary embodiment, the memory controller 104 is capable of transmitting the corresponding segment among the R-APDU to the host system 1000 according to a logical block address corresponding to the read command, thereby preventing the application program 1120 from receiving an incorrect R-APDU due to the pre-fetching performed by using a plurality of read commands.

Figure 11:
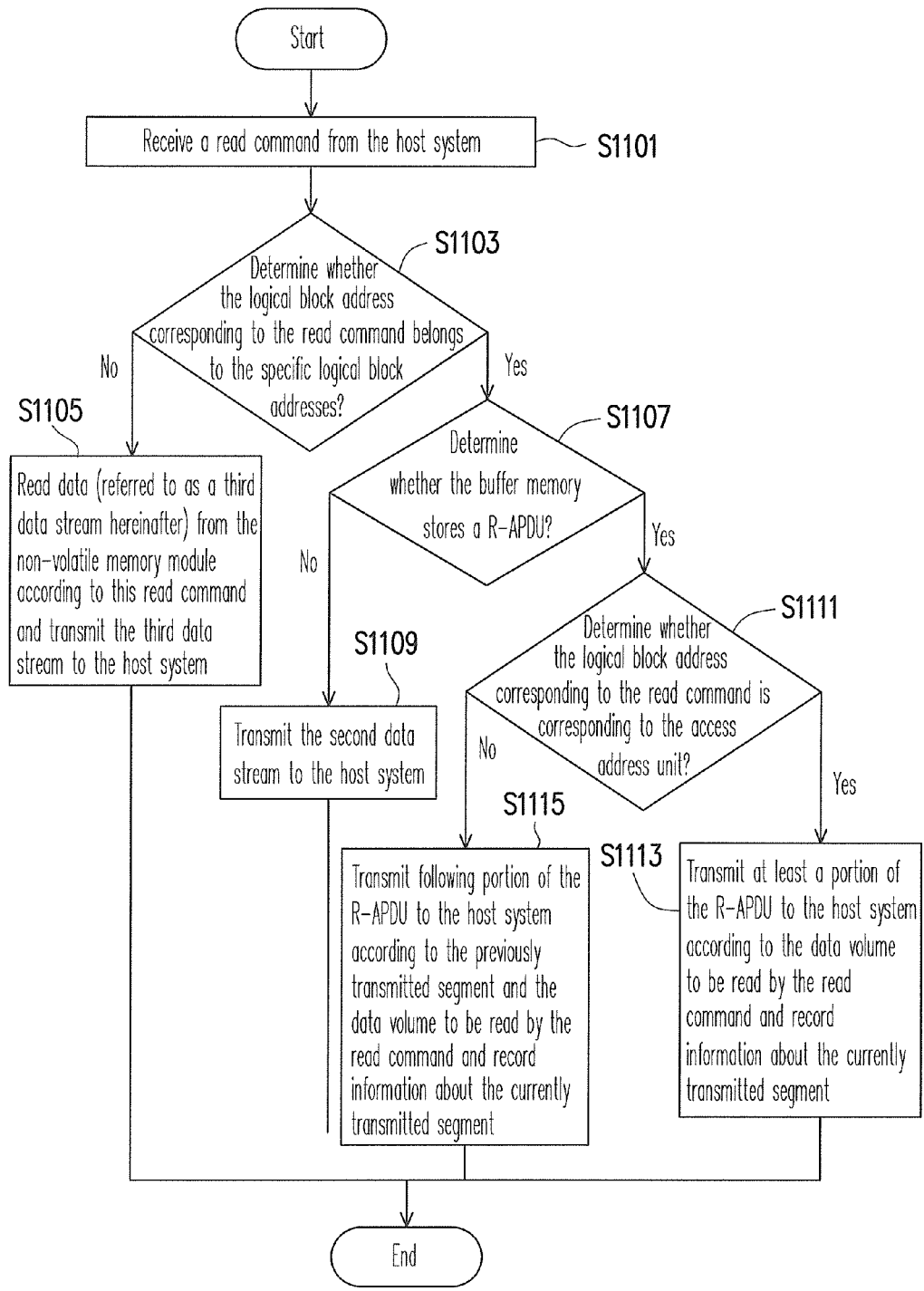
FIG. 11 is a flowchart of executing a read command according to the method of dispatching and transmitting data streams of the second exemplary embodiment.

FIG. 11 is a flowchart of executing a read command according to the method of dispatching and transmitting data streams of the second exemplary embodiment.

Referring to FIG. 11, in step S1101, the memory management circuit 202 of the memory controller 104 receives a read command from the host system 1000.

In step S1103, the memory management circuit 202 determines whether the logical block address corresponding to the read command belongs to the specific logical block addresses.

If the logical block address corresponding to the read command does not belong to the specific logical block addresses, in step S1105, the memory management circuit 202 reads data (referred to as a third data stream hereinafter) from the non-volatile memory module 106 according to this read command and transmits the third data stream to the host system 1000. If the logical block address corresponding to the read command belongs to the specific logical block addresses, in step S1107, the memory management circuit 202 determines whether the buffer memory 208 stores an R-APDU.

If the buffer memory 208 does not store any R-APDU, in step S1109, the memory management circuit 202 transmits the second data stream to the host system 1000. If the buffer memory 208 stores the R-APDU, in step S1111, the memory management circuit 202 determines whether the logical block address corresponding to the read command is corresponding to the access address unit (i.e., whether the logical block address corresponding to the read command is a multiple of the access address unit).

If the logical block address corresponding to the read command is corresponding to the access address unit, in step S1113, the memory management circuit 202 transmits at least a portion of the R-APDU to the host system 1000 according to the data volume to be read by the read command and records information about the currently transmitted segment.

If the logical block address corresponding to the read command is not corresponding to the access address unit, in step S1115, the memory management circuit 202 transmits following portion of the R-APDU to the host system 1000 according to the previously transmitted segment and the data volume to be read by the read command and records information about the currently transmitted segment. It should be noted that in the second exemplary embodiment, only after the entire R-APDU has transmitted to the host system 1000, the state of the state machine becomes the idle state 401 from the data available state 405.

In summary, in the method of dispatching and transmitting data streams, an R-APDU from the smart card chip is stored in the buffer memory. Additionally, when the state of the state machine is at the idle state and a command for reading a response data unit is received, the method according to the present exemplary embodiment transmits the response data unit stored in the buffer memory to the host system, thereby allowing the host system to repeatedly read the response data unit. Furthermore, the method according to the present exemplary embodiment identifies a pre-fetching with a plurality of read commands according to the logical block address corresponding to the read command, thereby transmitting a corresponding segment among the response data unit to the host system. The previously described exemplary embodiments of the present invention have the advantages aforementioned, wherein the advantages aforementioned not required in all versions of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method of dispatching and transmitting data streams, for a memory storage apparatus having a non-volatile memory module and a smart card chip, the method comprising:

configuring a plurality of logical block addresses for the non-volatile memory module, wherein a plurality of specific logical block addresses among the logical block addresses store a specific file;

receiving a response data unit from the smart card chip and storing the response data unit in a buffer memory, wherein the response data unit is a responses-application protocol data unit;

receiving a read command from a host system;

determining whether a logical block address corresponding to the read command belongs to any one of the specific logical block addresses and determining whether the buffer memory stores the response data unit;

adding a plurality of pad bits subsequent to the response data unit stored in the buffer memory and transmitting the response data unit stored in the buffer memory and the subsequent pad bits to the host system in response to the read command if the logical block address corresponding to the read command belongs to one of the specific logical block addresses and the buffer memory stores the response data unit;

adding the pad bits subsequent to a second data stream not requested by the read command and transmitting the second data stream and the subsequent pad bits to the host system in response to the read command if the logical block address corresponding to the read command belongs to one of the specific logical block addresses and the buffer memory does not store the response data unit, wherein a bit length of the pad bits is greater than a bit length of the response data unit and a bit length of the second data stream;

receiving a write command and a first data stream corresponding to the write command from the host system;

determining whether the first data stream contains a specific mark; and if the first data stream contains the specific mark, transmitting a command data unit among the first data stream to the smart card chip and deleting the response data unit stored in the buffer memory in response to the write command.

2. The method of dispatching and transmitting data streams according to claim 1, wherein each bit of the second data stream is 0.

3. The method of dispatching and transmitting data streams according to claim 1, further comprising:

when the logical block address corresponding to the read command does not belong to any one of the specific logical block addresses, reading a third data stream corresponding to the read command from the non-volatile memory module according to the logical block address corresponding to the read command and transmitting the third data stream to the host system.

4. The method of dispatching and transmitting data streams according to claim 1, further comprising:

writing the first data stream into the non-volatile memory module according to a logical block address corresponding to the write command when the first data stream does not contain the specific mark.

5. A method of dispatching and transmitting data stream, for a memory storage apparatus having a non-volatile memory module and a smart card chip, the method comprising:

configuring a plurality of logical block addresses for the non-volatile memory module, wherein a plurality of specific logical block addresses among the logical block addresses store a specific file;

receiving a response data unit from the smart card chip and storing the response data unit in a buffer memory, wherein the response data unit is a responses-application protocol data unit;

receiving a read command from a host system;

determining whether a logical block address corresponding to the read command belongs to any one of the specific logical block addresses and determining whether the buffer memory stores the response data unit;

determining whether the logical block address corresponding to the read command is corresponding to an access address unit when the logical block address corresponding to the read command belongs to one of the specific logical block addresses and the buffer memory stores the response data unit;

adding a plurality of pad bits subsequent to the response data unit stored in the buffer memory and transmitting at least a portion of the response data unit stored in the buffer memory and the subsequent pad bits to the host system in response to the read command if the logical block address corresponding to the read command is corresponding to the access address unit;

adding the pad bits subsequent to a second data stream not requested by the read command and transmitting the second data stream and the subsequent pad bits to the host system in response to the read command if the logical block address corresponding to the read command belongs to one of the special logical block addresses and the buffer memory does not store the response data unit, wherein a bit length of the pad bits is greater than a bit length of the response data unit and a bit length of the second data stream;

receiving a write command and a first data stream corresponding to the write command from the host system;

determining whether the first data stream contains a specific mark; and if the first data stream contains the specific mark, transmitting a command data unit among the first data stream to the smart card chip and deleting the response data unit stored in the buffer memory in response to the write command.

6. The method of dispatching and transmitting data streams according to claim 5, further comprising:

transmitting a corresponding segment following the at least a portion of the response data unit among the response data unit stored in the buffer memory to the host system when the logical block address corresponding to the read command is not corresponding to the access address unit.

7. The method of dispatching and transmitting data streams according to claim 5, wherein each bit of the second data stream is 0.

8. The method of dispatching and transmitting data streams according to claim 5, further comprising:

when the logical block address corresponding to the read command does not belong to any one of the special logical block addresses, reading a third data stream corresponding to the read command from the non-volatile memory module according to the logical block address corresponding to the read command and transmitting the third data stream to the host system.

9. The method of dispatching and transmitting data streams according to claim 5, further comprising:

writing the first data stream into the non-volatile memory module according to a logical block address corresponding to the write command when the first data stream does not contain the specific mark.

10. A memory controller, for a memory storage apparatus having a non-volatile memory module and a smart card chip, the memory controller comprising:

a host interface, configured to couple to a host system;
a memory interface, configured to couple to the non-volatile memory module;
a buffer memory; and
a memory management circuit, coupled to the buffer memory, the host interface and the memory interface, wherein the memory management circuit is configured to:

configure a plurality of logical block addresses for the non-volatile memory module, wherein a plurality of specific logical block addresses among the logical block addresses store a specific file;

receive a response data unit from the smart card chip and store the response data unit in the buffer memory, wherein the response data unit is a responses-application protocol data unit;

receive a read command from the host system;

determine whether a logical block address corresponding to the read command belongs to any one of the specific logical block addresses and determine whether the buffer memory stores the response data unit;

add a plurality of pad bits subsequent to the response data unit stored in the buffer memory and transmit the response data unit stored in the buffer memory and the subsequent pad bits to the host system in response to the read command if the logical block address corresponding to the read command belongs to one of the special logical block addresses and the buffer memory stores the response data unit;

adding the pad bits subsequent to a second data stream not requested by the read command and transmit the second data stream and the subsequent pad bits to the host system in response to the read command if the logical block address corresponding to the read command belongs to one of the specific logical block addresses and the buffer memory does not store the response data unit, wherein a bit length of the pad bits is greater than a bit length of the response data unit and a bit length of the second data stream;

receive a write command and a first data stream corresponding to the write command from the host system;

determine whether the first data stream contains a specific mark; and transmit a command data unit among the first data stream to the smart card chip and delete the response data unit stored in the buffer memory in response to the write command if the first data stream contains the specific mark.

11. A memory controller, for a memory storage apparatus having a non-volatile memory module and a smart card chip, the memory controller comprising:

a host interface, configured to couple to a host system;
a memory interface, configured to couple to the non-volatile memory module;
a buffer memory; and
a memory management circuit, coupled to the buffer memory, the host interface and the memory interface, wherein the memory management circuit is configured to:

configure a plurality of logical block addresses, wherein a plurality of specific logical block addresses among the logical block addresses store a specific file;

receive a response data unit from the smart card chip and store the response data unit in the buffer memory, wherein the response data unit is a responses-application protocol data unit;

receive a read command from the host system;

determine whether a logical block address corresponding to the read command belongs to any one of the specific logical block addresses and determine whether the buffer memory stores the response data unit;

determine whether the logical block address corresponding to the read command is corresponding to an access address unit when the logical block address corresponding to the read command belongs to one of the specific logical block addresses and the buffer memory stores the response data unit;

add a plurality of pad bits subsequent to at least a portion of the response data unit stored in the buffer memory and transmit the at least a portion of the response data unit stored in the buffer memory and the subsequent pad bit to the host system in response to the read command if the logical block address corresponding to the read command is corresponding to the access address unit;

add a plurality of pad bits subsequent to a second data stream not requested by the read command and transmit the second data stream and the subsequent pad bits to the host system in response to the read command if the logical block address corresponding to the read command belongs to one of the special logical block addresses and the buffer memory does not store the response data unit, wherein a bit length of the pad bits is greater than a bit length of the response data unit and a bit length of the second data stream;

receive a write command and a first data stream corresponding to the write command from the host system;

determine whether the first data stream contains a specific mark; and transmit a command data unit among the first data stream to the smart card chip and delete the response data unit stored in the buffer memory in response to the write command if the first data stream contains the specific mark.

12. The memory controller according to claim 11, wherein the memory management circuit is further configured to transmit a corresponding segment following the at least a portion of the response data unit among the response data unit stored in the buffer memory to the host system when the logical block address corresponding to the read command is not corresponding to the access address unit.

13. The memory controller according to claim 11, wherein each bit of the second data stream is 0.

14. The memory controller according to claim 11, wherein the memory management circuit is further configured to read a third data stream corresponding to the read command from the non-volatile memory module according to the logical block address corresponding to the read command and transmit the third data stream to the host system when the logical block address corresponding to the read command does not belong to one of the special logical block addresses.

15. The memory controller according to claim 11, wherein the memory management circuit is further configured to write the first data stream into the non-volatile memory module according to a logical block address corresponding to the write command when the first data stream does not contain the specific mark.

16. A memory storage apparatus, comprising:

a connector, configured to couple to a host system;

a non-volatile memory module;

a smart card chip; and a memory controller, coupled to the connector, the non-volatile memory module and the smart card chip and having a buffer memory, wherein the memory controller is further configured to:

configure a plurality of logical block addresses for the non-volatile memory module, wherein a plurality of specific logical block addresses among the logical block addresses store a specific file;

receive a response data unit from the smart card chip and store the response data unit in the buffer memory, wherein the response data unit is a responses-application protocol data unit;

receive a read command from the host system;

determine whether a logical block address corresponding to the read command belongs to any one of the specific logical block addresses and determine whether the buffer memory stores the response data unit;

add a plurality of pad bits subsequent to the response data unit stored in the buffer memory and transmit the response data unit stored in the buffer memory and the subsequent pad bits to the host system in response to the read command if the logical block address corresponding to the read command belongs to one of the special logical block addresses and the buffer memory stores the response data unit;

add the pad bits subsequent to a second data stream not requested by the read command and transmit the second data stream and the subsequent pad bits to the host system in response to the read command if the logical block address corresponding to the read command belongs to one of the special logical block addresses and the buffer memory does not store the response data unit, wherein a bit length of the pad bits is greater than a bit length of the response data unit and a bit length of the second data stream;

receive a write command and a first data stream corresponding to the write command from the host system;

determine whether the first data stream contains a specific mark; and transmit a command data unit among the first data stream to the smart card chip and delete the response data unit stored in the buffer memory in response to the write command if the first data stream contains the specific mark.

17. The memory storage apparatus according to claim 16, wherein each bit of the second data stream is 0.

18. The memory storage apparatus according to claim 16, wherein the memory controller is further configured to read a third data stream corresponding to the read command from the non-volatile memory module according to the logical block address corresponding to the read command and transmit the third data stream to the host system when the logical block address corresponding to the read command does not belong to any one of the special logical block addresses.

19. The memory storage apparatus according to claim 16, wherein the memory controller is further configured to write the first data stream into the non-volatile memory module according to a logical block address corresponding to the write command when the first data stream does not contain the specific mark.

20. A memory storage apparatus, comprising:

a connector, configured to couple to a host system;

a non-volatile memory module;

a smart card chip; and a memory controller, coupled to the connector, the non-volatile memory module and the smart card chip and having a buffer memory, wherein the memory controller is further configured to:

configure a plurality of logical block addresses, wherein a plurality of specific logical block addresses among the logical block addresses store a specific file;

receive a response data unit from the smart card chip and store the response data unit in the buffer memory, wherein the response data unit is a responses-application protocol data unit;

receive a read command from the host system;

determine whether a logical block address corresponding to the read command belongs to any one of the specific logical block addresses and determine whether the buffer memory stores the response data unit;

determine whether the logical block address corresponding to the read command is corresponding to an access address unit when the logical block address corresponding to the read command belongs to one of the specific logical block addresses and the buffer memory stores the response data unit;

add a plurality of pad bits subsequent to at least a portion of the response data unit stored in the buffer memory and transmit the at least a portion of the response data unit stored in the buffer memory and the subsequent pad bits to the host system in response to the read command if the logical block address corresponding to the read command is corresponding to the access address unit; and add the pad bits subsequent to a second data stream not requested by the read command and transmit the second data stream the subsequent pad bits to the host system in response to the read command if the logical block address corresponding to the read command belongs to one of the special logical block addresses and the buffer memory does not store the response data unit, wherein a bit length of the pad bits is greater than a bit length of the response data unit and a bit length of the second data stream;

receive a write command and a first data stream corresponding to the write command from the host system;

determine whether the first data stream contains a specific mark; and transmit a command data unit among the first data stream to the smart card chip and delete the response data unit stored in the buffer memory in response to the write command if the first data stream contains the specific mark.

\* \* \* \* \*